United States Patent
Brix et al.

(10) Patent No.: US 7,102,242 B2
(45) Date of Patent: Sep. 5, 2006

(54) LEAD-FREE GLASS TUBING, ESPECIALLY FOR ENCAPSULATING DIODES AND DIODES ENCAPSULATED WITH SAME

(75) Inventors: Peter Brix, Main (DE); Helmar Vetter, Mitterteich (DE); Oliver Fritz, Landshut (DE)

(73) Assignee: Schott AG, Mainz (DE)

( * ) Notice: Subject to any disclaimer, the term of this patent is extended or adjusted under 35 U.S.C. 154(b) by 39 days.

(21) Appl. No.: 11/037,325

(22) Filed: Jan. 18, 2005

(65) Prior Publication Data

US 2005/0130826 A1 Jun. 16, 2005

Related U.S. Application Data

(62) Division of application No. 10/268,631, filed on Oct. 10, 2002, now Pat. No. 6,864,197.

(30) Foreign Application Priority Data

Oct. 11, 2001 (DE) .......................... 101 50 239

(51) Int. Cl.
*H01L 23/29* (2006.01)
*C03C 3/066* (2006.01)
*C03C 3/093* (2006.01)

(52) U.S. Cl. ............................ 257/794; 501/65; 501/67; 501/79

(58) Field of Classification Search ................ 257/794; 501/65, 67, 79
See application file for complete search history.

(56) References Cited

U.S. PATENT DOCUMENTS

| 3,363,150 | A | * | 1/1968 | Whitman et al. | ............ 257/724 |
|---|---|---|---|---|---|
| 4,128,697 | A | * | 12/1978 | Simpson | ...................... 428/433 |
| 4,349,635 | A | * | 9/1982 | Davis et al. | ................... 501/15 |
| 4,417,913 | A | * | 11/1983 | Davis et al. | .................. 65/59.1 |
| 5,057,376 | A | * | 10/1991 | Sunahara et al. | ............ 428/432 |
| 5,827,790 | A | * | 10/1998 | Evans et al. | ................... 501/66 |
| 5,942,793 | A | * | 8/1999 | Senoo et al. | ................. 257/650 |
| 6,111,316 | A | * | 8/2000 | Jung et al. | ................... 257/713 |
| 6,534,346 | B1 | * | 3/2003 | Kosokabe | .................... 438/127 |
| 6,724,094 | B1 | * | 4/2004 | Kosokabe | .................... 257/794 |
| 6,864,197 | B1 | * | 3/2005 | Brix et al. | ...................... 501/65 |

FOREIGN PATENT DOCUMENTS

| DE | 3122387 | * | 12/1982 |
|---|---|---|---|
| DE | 251967 | * | 12/1987 |
| EP | 1156020 | * | 11/2001 |
| FR | 2566178 | * | 12/1985 |
| GB | 1128439 | * | 9/1968 |
| WO | 83/01442 | * | 4/1983 |

OTHER PUBLICATIONS

H. G. Pfaender: "Schott Guide to Glass", Chapman & Hall, London, 1996, p. 93,139, 140.
Horst Scholze: "Glas Nature, Struktur und Eigenschaften", Third Edition, Springer Verlag, Berlin, 1988, pp. 54–59.
Werner Vogel; "Glaschemie", Veb Deutscher Verlag Fuer Grundstoffindustrie, Leipzig, 1979, pp. 206–207, 399.

* cited by examiner

*Primary Examiner*—Karl Group
(74) *Attorney, Agent, or Firm*—Michael J. Striker

(57) ABSTRACT

The lead-free glass tubing of the $SiO_2$—$B_2O_3$—$R_2O$—$BaO$—$ZnO$—$TiO_2$ system has a composition, in percent by weight on an oxide basis, consisting essentially of: $SiO_2$, 34 to 52; $B_2O_3$, 10 to 25; $Al_2O_3$, 0 to 25; $Li_2O$, 2 to 6; $Na_2O$, 4 to 10; $K_2O$, 2 to 6; $CaO$, 0 to 4; $BaO$, 1 to 5; $ZnO$, 4 to 12; $TiO_2$, 2 to 6, and at least one refining agent in an effective amount for refining. An encapsulated diode consisting of a diode encapsulated with this lead-free glass tubing is also disclosed.

7 Claims, No Drawings

LEAD-FREE GLASS TUBING, ESPECIALLY FOR ENCAPSULATING DIODES AND DIODES ENCAPSULATED WITH SAME

CROSS-REFERENCE

This is a divisional of U.S. patent application Ser. No. 10/268,631, filed Oct. 10, 2002, which has now been allowed as U.S. Pat. No. 6,864,197.

BACKGROUND OF THE INVENTION

1. Field of the Invention

The present invention relates to lead-free glass tubing or pipes, especially for use in a method of encapsulating diodes and also to diodes made thereby.

2. Description of the Related Arts

Diodes are semiconductor electronic components, which are characterized by a strongly asymmetric current-voltage characteristic curve. Diodes are predominantly used for rectification of alternating current.

Conventional diodes, especially low-power diodes, comprise a silicon chip, which is pre-passivated along its periphery and which has a contact between an n-type semiconductor and a p-type semiconductor, terminals made of cooper-clad wire and/or copper head pins and a glass tube, which encapsulates the diode including the terminal positions. One type of terminal comprises a core made of, for example Ni/Fe-42-alloy or Ni/Fe-47 alloy, which has a copper surrounding jacket, which is coated with $Cu_2O$. The contacting between the chip and the terminals occurs by pressure, which is maintained through the glass tubing.

Glasses for hermetic encapsulation of diodes, short diode glasses, must be adjusted in their thermal expansion properties and their viscosity temperature dependence to the alloy used for the metal conductors, so that peeling off or chipping off of glass from the terminal wires does not occur either in the manufacture of the diodes or during temperature variations. The $Cu_2O$ coating acts as an adhesive between the glass and the copper cladding. For a protective encapsulation the viscosity values of the glass should be such that processing can occur at low temperatures and short melting times. Typical numbers here are about 10 minutes at about 630° C. The diode glass should thus have a processing temperature (temperature at which the viscosity is $10^4$ dPas)$\leq$850° C., a softening temperature $E_W \leq 600°$ C. and a transformation temperature Tg of $\leq 480°$ C. Since the glass tubing section forms the diode body after melting, whose dimensions are predetermined and which should be satisfactorily printable, it may not be shaped substantially on melting in spite of good glassfication. The melting is thus performed at temperatures at which the glass has a viscosity of about $10^6$ dPas, In order to guarantee sufficient mechanical workability of the diodes, the diode glass should have an elastic modulus of >50 Gpa. If the diodes are encapsulated with a glass with a lower elastic modulus, they have an increasing tendency to peel or chip off from the board or plate, on which they are soldered.

Diode glass is produced as tubing. Typical tube dimensions are the following: outer diameters between 1.1 mm and 4.5 mm; salable dimensions are currently especially outer diameters of 1.4 mm, 1.52 mm and 1.78 mm. Typical interior diameters are between 0.65 mm and 0.86 mm. Besides the typical frequent round form of the diodes, diodes with square outer contours are known. These diodes and also diodes with other shapes are made in known ways.

For production of glass tubing, also especially with the named small diameters, high devitrification stability is required, so that crystal formation does not occur during tube drawing, e.g. from an outlet orifice or nozzle. The upper devitrification temperature, OEG, (liquidus temperature), is a measure of the devitrification stability. In the present case it should be at least 50 K under the processing temperature $V_A$. Moreover the growth speed of the crystals should be as small as possible. Generally there is a temperature $Kg_{max}$ (<OEG) at which the growth speed of the crystal is greatest, $v_{max}$. This $v_{max}$ should also be as small as possible.

The glass furthermore should have a sufficient resistance to washing processes in tubing manufacture and diode process. This is guaranteed with a class three water resistance according to DIN ISO 719.

A essential characteristic of a diode is its current-voltage characteristic in the blocking or high-resistance direction. The behavior or current-voltage curve should show a drastic or dramatic increase without notable edge rounding when the blocking or high-resistance voltage is exceeded. Also the blocking voltage of all diodes of one type should have the same value. The encapsulated glass may thus not impair the effectiveness of the diode, i.e. it may not contain damaged parts.

These requirements are fulfilled by the commercially obtainable diodes and diodes glasses. These diode glasses are alkali-poor, and are practically sodium-free and lithium-free although they contain up to the level of the usual impurities of these ingredients. However they can contain up to five percent by weight $K_2O$ and they contain an arbitrarily high concentration of PbO up to 60 percent by weight.

However PbO is environmentally unfriendly and legal considerations prevent the use of this ingredient in electrical and electronic devices. This has led to the goal of producing PbO-free glasses, which are suitable for encapsulating diodes and to lead-free diodes. An economical reproduction of the desired glass engineering properties influenced by PbO by replacing lead oxide with one or more other sufficiently available and economical ingredients has not succeeded up to now.

Also other electronic units, such as precision resistors, ceramic capacitors, tantalic capacitors or LEDs may be encapsulated like the diodes. The housings of these components have the same requirements as described for the diode glasses above.

EP 1 156 020 A1 describes PbO-free diode glasses, which contain $B_2O_3$ as a required ingredient and at least two alkali metal oxides, selected from the group consisting of $Li_2O$, $Na_2O$ and $K_2O$. In practice the disadvantage of these glasses is a reduced water resistance and a high mechanical susceptibility to failure.

SUMMARY OF THE INVENTION

It is an object of the present invention to provide a lead-free glass for encapsulation of electronic components, especially diodes, i.e. a lead-free glass, which fulfills the above-described specifications, which is sufficiently crystallization stable, low-melting, water-resistant and can bear sufficient mechanical loads.

It is another object of the present invention to provide a lead-free diode, i.e. a diode with lead-free encapsulation.

According to the invention the lead-free glass tubing has a composition, in percent by weight on an oxide basis, consisting essentially of:

| | |
|---|---|
| SiO$_2$ | 34 to 52, |
| B$_2$O$_3$ | 10 to 25, |
| Al$_2$O$_3$ | 0 to 25, |
| Li$_2$O | 2 to 6, |
| Na$_2$O | 4 to 10, |
| K$_2$O | 2 to 6, |
| CaO | 0 to 4, |
| BaO | 1 to 5, |
| ZnO | 4 to 12, |
| TiO$_2$ | 2 to 6, and |
| at least one refining agent in an effective amount for refining. | |

The invention also includes a method of making an encapsulated electronic component, especially an encapsulated diode, by encapsulating the electronic component in a section of the above-described glass tubing according to the invention. The invention further includes the encapsulated electronic component made by this method, especially the encapsulated diode.

In preferred embodiments of the lead-free glass tubing according to the invention the amount of SiO$_2$ present is from 38 to 50, especially from 38 to 47 percent by weight; the amount of B$_2$O$_3$ is preferably 11 to 21, especially from 13 to 21; the amount of Al$_2$O$_3$ is preferably from 1 to 22, especially from 2 to 20, and most preferably from 2 to 12, percent by weight; the amount of Li$_2$O, is preferably from 3 to 5 percent by weight, of Na$_2$O, preferably from 5 to 9, especially from 5 to 8, percent by weight; the amount of K$_2$O, is preferably from 3 to 5 percent by weight; the amount of CaO is preferably from 0 to 2, especially preferably from 1 to 2, percent by weight, the amount of BaO is preferably from 1 to 3 percent by weight, and the amount of ZnO is preferably from 6 to 12 percent by weight, especially from 6 to 10 percent by weight; and the amount of TiO$_2$, is preferably from 3 to 5 percent by weight.

The refining agent for the glass preferably comprises Sb$_2$O$_3$, As$_2$O$_3$, CeO$_2$ and/or NaCl, and is added in the usual effective amount to improve glass quality.

The glasses are melted from the standard raw materials and drawn in the conventional tube drawing process for glass tubing.

Glass compositions of this sort are already known from U.S. Pat. No. 4,417,913. The glass composition, in percent by weight on an oxide basis, disclosed in this reference is: SiO$_2$, 40 to 50; Al$_2$O$_3$, 2 to 12; K$_2$O, 2 to 6; Na$_2$O, 5 to 9; Li$_2$O, 2 to 6; CaO, 0 to 4; ZnO, 5 to 12; BaO, 1 to 5; TiO$_2$, 2 to 6; and B$_2$O$_3$, 13 to 21. This glass is used for a glass-metal feed-through as a compressed glass melt.

This compressed glass feed-through comprises an outer metal housing with a through-going hole, through which at least one isolated metallic conductor (wire) passes, and a portion of glass, which fills the opening between the outer metal housing and the metal wire and hermetically seals the wire in the hole. The coefficient of thermal expansion of the outer metal piece is substantially higher than that of the melted glass and the inner conductor. Because of that relationship the glass is under pressure during cooling in the manufacture of the glass-metal feed-through and thus a hermetic seal component is produced. This compression also protects the glass body from mechanical loads. During the manufacture the compressed glass melt is made from glass powder or a blank. The glass powder however must be first mixed with other components, usually a binding agent and adhesive, to adjust the expansion properties. This sort of powder is worked in a pressing/sintering process to form a glass body of suitable geometry, which is melted in the metallic housing with contacts and thus the hermetic seal component is formed.

It has been found surprisingly that the glass according to the invention is also suitable for manufacture by the melt and even for processing by tube drawing. Because of its composition and its current usage, it was unexpected that it would have devitrification stability correct for tube drawing.

It was also found that the glass tubing according to the invention was suitable for encapsulating diodes and other electronic devices, e.g. precision resistors, ceramic or tantalic capacitors or LEDs. The glasses permit a protective encapsulation at relatively low temperature and surprisingly do not damage the operation of the diode despite their comparatively high alkali content because of their low melt and working temperatures. The glass tubing serves for encapsulation of the diode and does not put it under stress during melting with the metallic connection wires.

In contrast to EP 1 156 020 A1 the glasses according to the invention contain at least 2 percent by weight TiO$_2$. Surprisingly it has been shown that the water resistance and the devitrification stability are improved by the content of TiO$_2$. Especially also the elastic modulus is clearly significantly increased. Furthermore the surprisingly low thermal expansion coefficient of the glass according to the invention is due to the TiO$_2$ content.

The invention will be illustrated in its various aspects and features with the aid of the following example, which should not be considered as limiting any of the appended claims.

EXAMPLE

An example of the glass according to the invention (Example A) has a composition, in percent by weight on an oxide basis, consisting essentially of: SiO$_2$, 46; B$_2$O$_3$, 20; Al$_2$O$_3$, 2; Li$_2$O, 4; Na$_2$O, 8; K$_2$O, 4; CaO, 1; BaO, 2; ZnO, 9; TiO$_2$, 4, and 0.2 Sb$_2$O$_3$ (additive amount). This glass was prepared starting with the usual raw materials by melting at 1280° C., refining for 30 minutes at 1250° C., and stirring for 20 min at 1100° C. An additional example of the glass (Example B) according to the invention has a composition, in percent by weight on an oxide basis, consisting essentially of: SiO$_2$, 45.7; B$_2$O$_3$, 20.5; Al$_2$O$_3$, 2; Li$_2$O, 4; Na$_2$O, 7.8; K$_2$O, 4; CaO, 1; BaO, 2; ZnO, 9; TiO$_2$, 4, and 0.2 Sb$_2$O$_3$ (additive amount). This glass was prepared in the same manner as example A by melting, refining and stirring. Subsequently the melt was allowed to stand at 1100° C. for 10 minutes and subsequently drawn in a drawing process to form tubing with an outer diameter of 1.52 mm and an interior diameter of 0.86 mm. Diodes were encapsulated with this glass tubing by melting under nitrogen atmosphere at 630° C. for 10 minutes. After a lengthy test, a 1000-hour climate controlled test, this diode did not fail and behaved in an equivalent manner to diodes encapsulated with commercial lead-containing glass. This is true for both electronic characteristic data—the current-voltage curve for example shows no edge rounding—and also the mechanical load or stress resistance data.

In Table I the properties of the examples A and B of the glass according to the invention are tabulated and compared with commercial glasses 8531 and 8532 of Schott Glas, which have a high content of lead. The properties tabulated include thermal expansion coefficient $\alpha_{20/300}$ [10$^{-6}$/K]

density $\rho$ [g/cm$^3$]

transformation temperature Tg [° C.]

temperature at which the viscosity is $10^{14.5}$ dpas, T 14.5 [° C.]

temperature at which the viscosity is $10^{13}$ dpas, T 13 [° C.]

temperature at which the viscosity is $10^{7.6}$ dpas, T 7.6 [° C.]

temperature at which the viscosity is $10^4$ dpas, T 4 [° C.]

class W of the water resistance according to DIN ISO 719 class S of the acid resistance according to DIN 12116 class L of alkali resistance according to DIN ISO 695

TK 100 [° C.]

dielectric constant DZ at 1 MHz loss angle tan δ at 1 MHz [$10^{-4}$]

optical stress constant K at 588 nm [$10^{-6}$ mm$^2$ N$^{-1}$]

elastic modulus E [Gpa]

Poisson number μ and index of refraction $n_d$

The physical and chemical properties of cast blocks of the glasses A and B of the invention and the commercial lead-containing glasses were measured. These properties are tabulated in Table I.

TABLE I

PROPERTIES OF LEAD-FREE GLASSES OF THE INVENTION AND LEAD-CONTAINING COMMERCIAL GLASSES

|  | A | B | 8531 | 8532 |
|---|---|---|---|---|
| $\alpha_{20/300}$ [$10^{-6}$/K] | 9.1 | 9.0 | 9.0 | 8.8 |
| ρ [g/cm$^3$] | 2.668 | 2.661 | 4.34 | 4.47 |
| Tg [° C.] | 466 | 464 | 440 | 430 |
| T 14.5 [° C.] | 452 | 450 | 409 | 413 |
| T 13 [° C.] | 469 | 470 | 430 | 425 |
| T 7.6 [° C.] | 574 | 576 | 590 | 565 |
| T 4 [° C.] | 743 | 734 | 830 | 760 |
| W | 3 | 3 | 1 | 1 |
| S | 4 | 4 | 4 | 4 |
| L | 3 | 3 | 3 | 3 |
| TK 100[° C.] | 276 | 278 | 450 | 440 |
| DZ | 7.3 | 7.3 | 9.50 | 10.2 |
| Tan δ [$10^{-4}$] | 24 | 25 | 9 | 9 |
| K [$10^{-6}$ mm$^2$ N$^{-1}$] | 2.91 | 2.90 | 2.2 | 1.7 |
| E [Gpa] | 85 | 85 | 52 | 56 |
| μ | 0.238 | 0.235 | 0.24 | 0.24 |
| $n_d$ | 1.566 | 1.565 | 1.700 | 1.724 |

No crystals were found for A and B after tempering times of 5 min and 1 hour in a gradient oven. Only very little crystallization was observed after a 24 hour period (OEG 690° C., connected with a very small $V_{max}$ of 0.54 μm/h at 640° C. ($Kg_{max}$)). The glass according to the invention is thus characterized by being very devitrification stable.

The comparisons in Table I show that the lead-free diode glasses A and B according to the invention are equally as good as the commercial lead-containing glasses 8531 and 8532 despite their different dielectric properties and their different insulating action. In regard to their mechanical stress resistance, which is reflected in the E-modulus, they are superior. Also their lower density is clearly advantageous.

Their water resistance class is sufficient for manufacture and use. The diode glass according to the invention has processing temperatures $V_A \leq 850°$ C., the softening temperatures $E_W \leq 600°$ C. and transformation temperatures $Tg \leq 480°$ C.

Thus they are low melting and outstandingly suitable for a careful encapsulation of diodes and other electronic components at relatively low temperatures, also in melting with connecting wires.

Furthermore their thermal expansion properties are well adjusted to the material used for the connecting wires with their thermal expansion coefficients $\alpha_{20/300}$ of $8.6 \times 10^{-6}$/K to $9.2 \times 10^{-6}$/K.

Diode glasses are very devitrification stable and thus obtained by means of a tube drawing process.

The lead-free diodes according to the invention are equally good as the commercial lead-containing diodes, also they are as economical to make.

The essential advantage is that both the glass tubing, the diodes and their manufacture are free of PbO and thus environmentally friendly without impairing the required specifications and properties.

The disclosure in German Patent Application 101 50 239.7 of Oct. 11, 2002 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in lead-free glass tubing, its use and diodes made with it, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. Lead-free glass tubing having a composition, in percent by weight on an oxide basis, consisting essentially of:

| | |
|---|---|
| SiO$_2$ | 34 to 52, |
| B$_2$O$_3$ | 10 to 25, |
| Al$_2$O$_3$ | 0 to 25, |
| Li$_2$O | 2 to 6, |
| Na$_2$O | 4 to 10, |
| K$_2$O | 2 to 6, |
| CaO | 0 to 4, |
| BaO | 1 to 5, |
| ZnO | 4 to 12, |
| TiO$_2$ | 2 to 6, and |
| at least one refining agent in an effective amount for refining. | | at least one refining agent in an effective amount for refining.

2. The lead-free glass tubing as defined in claim 1, wherein said at least one refining agent is selected from the group consisting of Sb$_2$O$_3$, As$_2$O$_3$, CeO$_2$ and NaCl.

3. An encapsulated diode comprising a diode and lead-free glass tubing encapsulating said diode, wherein said lead-free glass tubing has a composition, in percent by weight on an oxide basis, consisting essentially of:

| | |
|---|---|
| SiO$_2$ | 34 to 52, |
| B$_2$O$_3$ | 10 to 25, |
| Al$_2$O$_3$ | 0 to 25, |
| Li$_2$O | 2 to 6, |
| Na$_2$O | 4 to 10, |
| K$_2$O | 2 to 6, |

-continued

| | |
|---|---|
| CaO | 0 to 4, |
| BaO | 1 to 5, |
| ZnO | 4 to 12, |
| TiO$_2$ | 2 to 6, and |
| at least one refining agent in an effective amount for refining. | | at least one refining agent in an effective amount for refining.

4. The encapsulated diode as defined in claim 3, wherein said at least one refining agent is selected from the group consisting of Sb$_2$O$_3$, As$_2$O$_3$, CeO$_2$ and NaCl.

5. The lead-free glass tubing as defined in claim 1, wherein said composition consists essential of from 38 to 50 percent by weight of said SiO$_2$, from 11 to 21 percent by weight of said B$_2$O$_3$, from 1 to 22 percent by weight of said Al$_2$O$_3$, from 3 to 5 percent by weight of said Li$_2$O, from 5 to 9 percent by weight of said Na$_2$O, from 3 to 5 percent by weight of said K$_2$O, from 1 to 2 percent by weight of said CaO, from 1 to 3 percent by weight of said BaO, from 6 to 12 percent by weight of said ZnO and from 3 to 5 percent by weight of said TiO$_2$.

6. The lead-free glass tubing as defined in claim 1, wherein said composition consists essential of from 38 to 47 percent by weight of said SiO$_2$, from 13 to 21 percent by weight of said B$_2$O$_3$, from 2 to 20 percent by weight of said Al$_2$O$_3$, from 3 to 5 percent by weight of said Li$_2$O, from 5 to 8 percent by weight of said Na$_2$O, from 3 to 5 percent by weight of said K$_2$O, from 1 to 2 percent by weight of said CaO, from 1 to 3 percent by weight of said BaO, from 6 to 10 percent by weight of said ZnO and from 3 to 5 percent by weight of said TiO$_2$.

7. The lead-free glass tubing as defined in claim 1, having a processing temperature $V_A \leq 850°$ C., an upper devitrification temperature OEG of 690°, a softening temperature $E_W \leq 600°$ C., a transformation temperature $Tg \leq 480°$ C., a thermal expansion coefficient $\alpha_{20/300}$ of $8.6 \times 10^{-6}$/K to $9.2 \times 10^{-6}$/K and an elastic modulus E>50 Gpa.

* * * * *